S. Stoughton,
Horse Rake.
No. 89,605. Patented May 4, 1869.
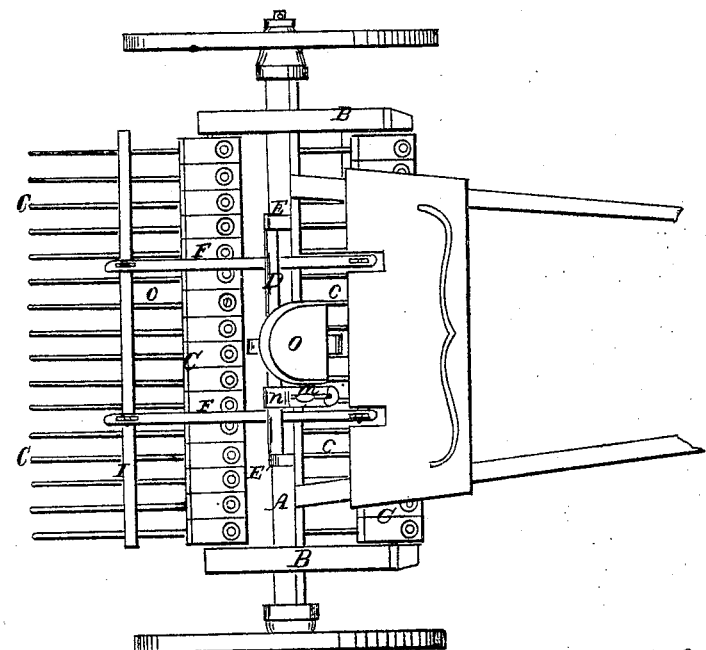
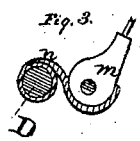
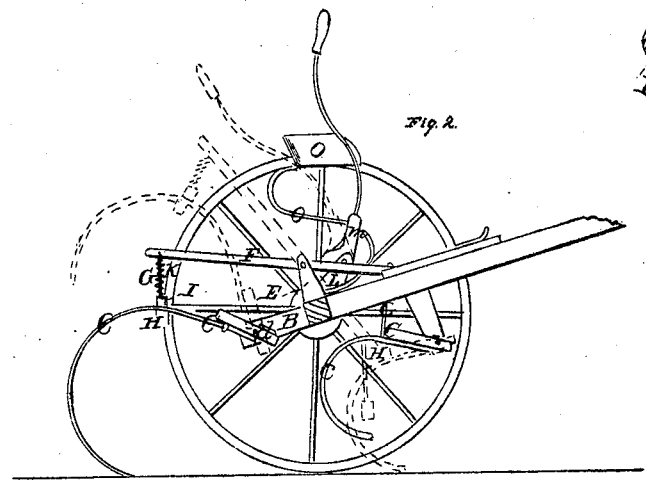
Inventor.
Sumner Stoughton
Witnesses.
Geo. W. Tibbills
J. Holmes

United States Patent Office.

SUMNER STOUGHTON, OF WINDSOR, OHIO, ASSIGNOR TO HIMSELF AND LEVERETT GROVER.

Letters Patent No. 89,605, dated May 4, 1869.

IMPROVEMENT IN HORSE-RAKES.

The Schedule referred to in these Letters Patent and making part of the same.

*To all whom it may concern:*

Be it known that I, SUMNER STOUGHTON, of Windsor, in the county of Ashtabula, and State of Ohio, have invented a certain new and improved Horse Hay-Rake; and I do hereby declare that the following is a full and complete description of the construction and operation of the same, reference being had to the accompanying drawings, making a part of this specification, in which—

Figure 1 is a plan view.
Figure 2 is a side view.
Figure 3 is a detached view.

Like letters of reference refer to like parts in the views.

The nature of this invention relates to the construction and arrangement of a horse hay-rake, whereby the work is more completely performed, and in a more easy and convenient manner.

It is provided with two sets of tines, one set placed directly in front of, and each counterbalancing the other, and both are operated, in raising and lowering, by the same lever.

The object in this mode of construction is, to provide a way whereby the hay may all be gathered, for it is well known that with a rake having but one set of tines, when the said rake is in motion, and the tines are lifted to deposit a windrow, a portion of the hay is skipped, rendering it necessary for a person to go over the field and gather up the untouched hay. This is entirely overcome by the use of this machine.

A, fig. 1, represents the axle-tree, which supports the frame-work and other working-parts of this machine.

B B are cross-pieces, to which are suspended the rakes C C'.

The rakes consist of separate tines, c c, which work or turn independently of one another, upon the rod d, which supports them. This is to enable them to rise and pass over any obstructions they may meet with without disarranging the others.

The lifting-apparatus consists of a roller, D, pivoted at each end to the posts E E, and has two arms F F, which pass through it near its ends, these arms extending both forward and backward.

At each end of these arms are suspended, by a joint, other shorter arms, G G, and attached to their lower ends is a bar, H, over which the tines c c pass and rest, and over the tines is a second bar, I, which slips loosely over the arms G G, and upon the arms G G are spiral springs K K.

The bar I and springs K are intended to keep the tines down, or force them down, when they have been raised by passing over obstructions.

Upon the axle-tree is placed a post, L, to which is pivoted a lever, M, the lower end of which is rounded, as seen in fig. 3, and there is a strap of leather, n, attached to and wound around the roller D, the other end passing under and secured to the front side of the lever M. When this lever is thrown backward, it takes up the strap n, and causes the roller to be turned over, which raises the rear end of the arms F F, to be lifted, and the forward ends, to be depressed.

A spring and seat, O, are provided, to accommodate a driver or operator.

What I claim as my improvement, and desire to secure by Letters Patent, is—

The lever M and strap n, in combination with the arms F, as shown and for the purpose set forth.

SUMNER STOUGHTON.

Witnesses:
GEO. W. TIBBITTS,
A. J. MARVIN.